Figure 1:
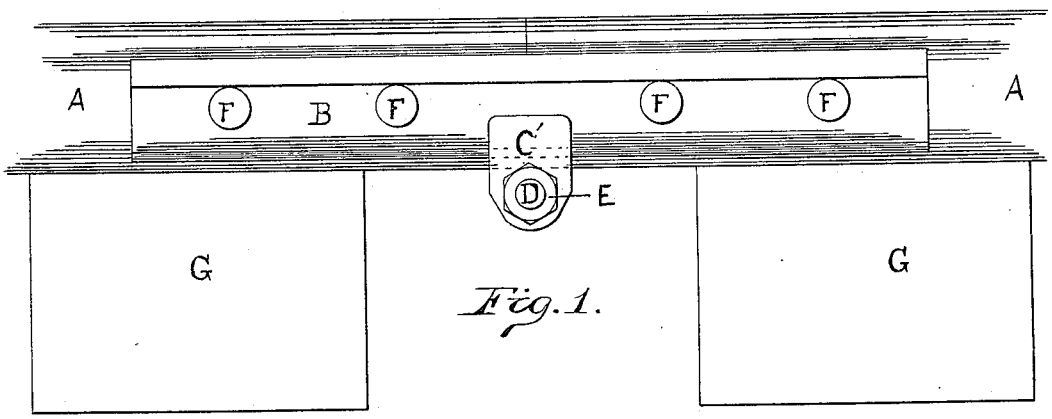

(No Model.)

H. F. COX.
RAIL SPLICE.

No. 362,723. Patented May 10, 1887.

WITNESSES:
H. W. Ham Powel.
Joshua Matlack, Jr.

INVENTOR
Henry F. Cox
by his attorney
Francis T. Chambers

UNITED STATES PATENT OFFICE.

HENRY F. COX, OF PHILADELPHIA, PENNSYLVANIA.

RAIL-SPLICE.

SPECIFICATION forming part of Letters Patent No. 362,723, dated May 10, 1887.

Application filed March 7, 1887. Serial No. 229,923. (No model.)

*To all whom it may concern:*

Be it known that I, HENRY F. COX, of Philadelphia, State of Pennsylvania, have invented a new and useful Improvement in Rail-Splices, of which the following is a true and exact description, due reference being had to the accompanying drawings, which form a part of this specification.

My invention relates to that class of devices which are used for securing together the ends of railroad-rails. It is desirable that the ends of the joining rails should, under the pressure of a passing train, register with each other not only in a horizontal direction, but also vertically—that is, that what in railroading is called "line" and "surface" should both be made as perfect as possible.

Among the devices for preserving the line or horizontal alignment of the rails, fish-plates have been found the most effective, and especially what is known as the "double-angle fish-plate," though its use has many drawbacks, notably the wearing away of the upper sides of the rail-base and the under sides of the head of the rail, due to its friction with them. Such double-angle fish-plates, when constructed, as has heretofore been generally the case, with their lower flange extending downward so as to come in contact with the tie, have also been found to cut the upper part of the web of the rail. This difficulty has been overcome by constructing the fish-plates as shown in the drawings hereto attached, which said construction, however, I do not claim as my invention.

To preserve the surface alignment or surface of the rails, various forms of clamps have been devised and applied, with more or less success, and attempts have been made to construct such clamps so that they will at the same time perform the function of the fish-plate as well as their proper function of preserving the vertical alignment, such attempts, however, being, I believe, never practically successful.

The object of my invention is to so combine the fish-plates and splice-clamp that they will not only each perform their own function in preserving the line and surface of the track, but will perform it better and with less injury to the rails than has heretofore been the case.

Figure 2:
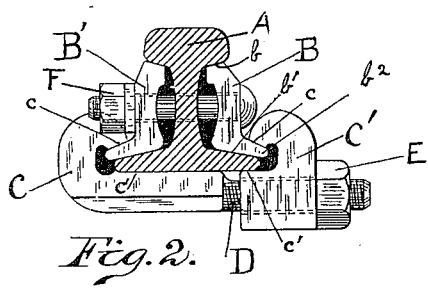

Referring now to the drawings which illustrate my invention, Figure 1 is an elevation of a rail-joint provided with my improved device; Fig. 2, an end view of my combined splice and clamp connected with the rail, and Fig. 3 a similar view showing a modified form of clamp in section.

A A are rails. B B are double angle fish-plates; C and C', two jaws constituting a clamp for the base of the rail; $C^3$ and $C^2$, two other jaws, constituting a clamp of a somewhat different kind; D and D', bolts for securing the clamp in place; E, nuts working on the bolts D or D'; F, the ordinary bolts and nuts securing the fish-plates in place; G G, railroad-ties, and H H, Fig. 3, projections in the inside of jaws $C^2$ and $C^3$, intended to engage with notches in the fish-plates and prevent creeping.

The fish-plates B fit against the head of the rail at $b$ and against the top of the rail-base at $b'$, in the usual way, the outer end, $b^2$, projecting slightly beyond the rail, as shown. They are secured in the usual way by a bolt, F. The jaws C C' of the clamp are curved so as to have projecting hooks, which fit over the lower flange of the double angle fish-plate above the rail-base, as at $c$. The under side of the clamp rests against the base of the rail, and should preferably come in contact with it below the point $c$, where the hook engages the splice-bar, as is shown at $c'$. The hook-jaws of the clamp are so formed as to entirely clear the edges of the fish-plates and rail-base, and the clamp, when its two jaws are drawn together, wedges itself tightly on each side of the rail-base as well as beneath the same, clamping the bottom flange of the fish-plates and the flanges of the rail-base tightly together and coacting with the bolt and nut F in clamping the fish-plates between the top and bottom of the rail.

Figure 3:
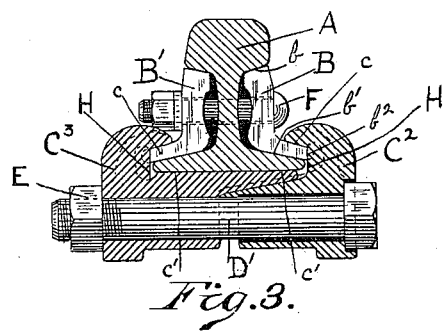

The clamping action of the clamp is due to the combined action of the screw and the wedge-surfaces, which in Fig. 2 are the inclined faces of the lower flanges of the fish-plates, while in Fig. 3 these wedge-surfaces are supplemented by wedge-surfaces formed on the under side of the clamp itself. Even if the ordinary fish-plates, the lower edges of which come in contact with the ties, are used, they cannot, when clamped in the way shown, be tilted up so as to press and wear the web of the rail, and either with the old or the improved form shown the connection between the rail and fish-plates is so much more perfect as to greatly diminish the wearing action on the head and base of the rail heretofore mentioned. It will of course readily be seen that by this device both surface and line in the track is practically insured.

Having now described my invention, what I claim as new, and desire to secure by Letters Patent, is—

In combination with double-angle fish-plates fitting beneath the head and against the base of the rails, wedging clamping-jaws passing over the bottom flanges of the rail-bases and fish-plates and adapted to clamp them tightly together when said clamps are drawn toward each other, and a bolt secured to the clamps beneath the rail-base, whereby said clamps are drawn together and made to grasp and secure the rail and angle-flanges, as aforesaid.

HENRY F. COX.

Witnesses:
LISLE STOKES,
FRANCIS T. CHAMBERS.